United States Patent [19]

Buckner

[11] 4,140,994
[45] Feb. 20, 1979

[54] METHOD AND APPARATUS FOR ACOUSTIC WELL LOGGING OF EARTH BOREHOLES

[75] Inventor: Guy O. Buckner, Houston, Tex.

[73] Assignee: Dresser Industries, Inc., Dallas, Tex.

[21] Appl. No.: 847,963

[22] Filed: Nov. 2, 1977

[51] Int. Cl.² ............................................. G01V 1/40
[52] U.S. Cl. ...................... 340/15.5 A; 340/15.5 BH; 340/15.5 SW; 340/15.5 GC; 181/103
[58] Field of Search ............... 340/15.5 BH, 15.5 TN, 340/15.5 A, 15.5 AC, 15.5 GC, 15.5 SW; 181/102, 103; 325/326; 330/129, 138; 328/53, 171, 175; 307/264

[56] References Cited

U.S. PATENT DOCUMENTS

| 2,817,715 | 12/1957 | Blake | 340/15.5 GC |
|---|---|---|---|
| 3,252,131 | 5/1966 | Vogel | 340/15.5 SW |
| 3,289,157 | 11/1966 | Brokaw | 340/15.5 A |
| 3,322,229 | 5/1967 | Smith | 340/15.5 A |
| 3,376,557 | 4/1968 | Godinez | 340/15.5 GC |
| 3,467,875 | 9/1969 | Angle | 328/147 |
| 3,621,410 | 11/1971 | Badger et al. | 330/129 |
| 3,828,262 | 8/1974 | Trocqueme | 340/15.5 A |
| 4,042,907 | 8/1977 | Troviller et al. | 340/15.5 BH |

Primary Examiner—Nelson Moskowitz
Attorney, Agent, or Firm—Albert M. Crowder, Jr.

[57] ABSTRACT

In order to prevent late arriving and higher amplitude shear waves from saturating the subsurface amplifier, the amplitude of each succeeding positive half cycle of the earlier arriving compressional wave is measured and a negative feedback is supplied to the amplifier if the measured amplitude exceeds 50% of full scale. Circuitry is provided for utilization of a two transmitter, two receiver system using the same type of negative feedback to control the gain of the subsurface amplifier.

11 Claims, 7 Drawing Figures

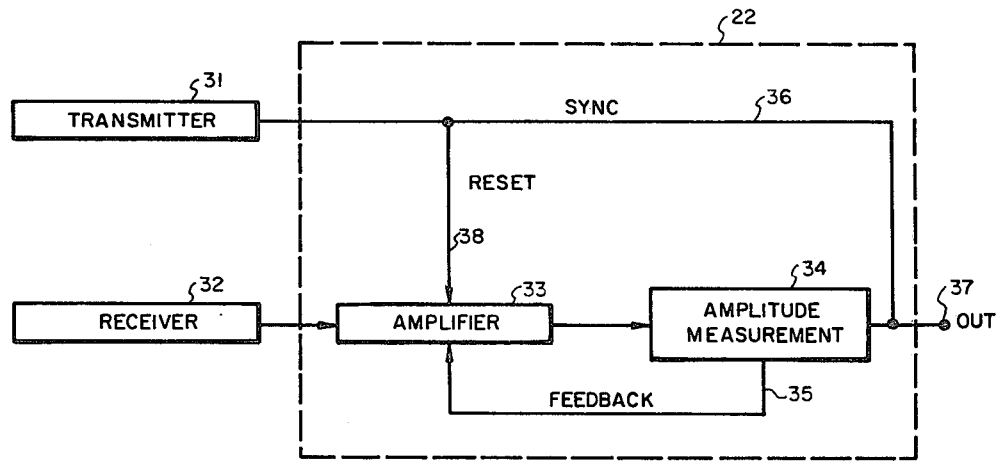
FIG. 2
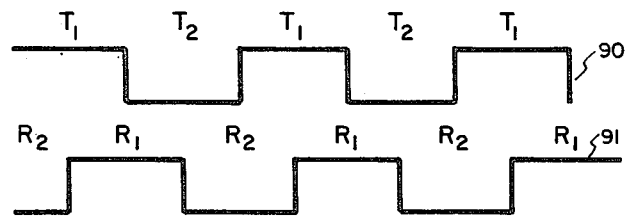
FIG. 4A
FIG. 4B

METHOD AND APPARATUS FOR ACOUSTIC WELL LOGGING OF EARTH BOREHOLES

BACKGROUND OF THE INVENTION

This invention relates generally to acoustic well logging of earth boreholes, and in particular, to methods and apparatus for measuring various formation parameters associated with the generation and reception of acoustic waves.

In a characteristic acoustic waveform, the compressional wave arrives at the acoustic receiver first because of the velocity of a shear wave being substantially less than that of the compressional wave velocity, typically being approximately 60% thereof. Furthermore, the amplitude of the shear wave on arrival is oftentimes much greater than the amplitude of the compressional wave and upon arriving, will even cause an addition of the two waves upon the coincidence of positive arrivals. In the prior art systems, with a gain of the amplifier set at an appropriate level for detecting the compressional wave first arrival, the first arrival of the shear wave will place the system in saturation. Conversely, with a gain of the amplifier set for the detection of the shear wave first arrival, the amplifier gain for the compressional wave will be too small for accurate measurement. Thus, there is no ideal gain setting for both the compressional and the shear wave in accordance with the heretofore state of the art.

It is therefore the primary object of the present invention to provide new and improved methods and apparatus for acoustically logging the formations surrounding earth boreholes.

It is another object of the invention to provide new and improved method and apparatus for detecting compressional and shear acoustic waves originating from the same transmitted acoustic wave.

The objects of the invention are accomplished, generally, by methods and apparatus which vary the gain of a subsurface amplifier in an acoustic well logging instrument used for amplifying subsequently received cycles in the same wave in response to the detection of a predetermined parameter relating to a given half cycle or to the cross-over between half cycles.

These and other objects, features and advantages of the present invention will be more apparent from a reading of the following detailed specification and drawing, in which:

FIG. 2 illustrates in block diagram an embodiment of the present invention utilizing a single acoustic transmitter and a single acoustic receiver;

Figure 3:
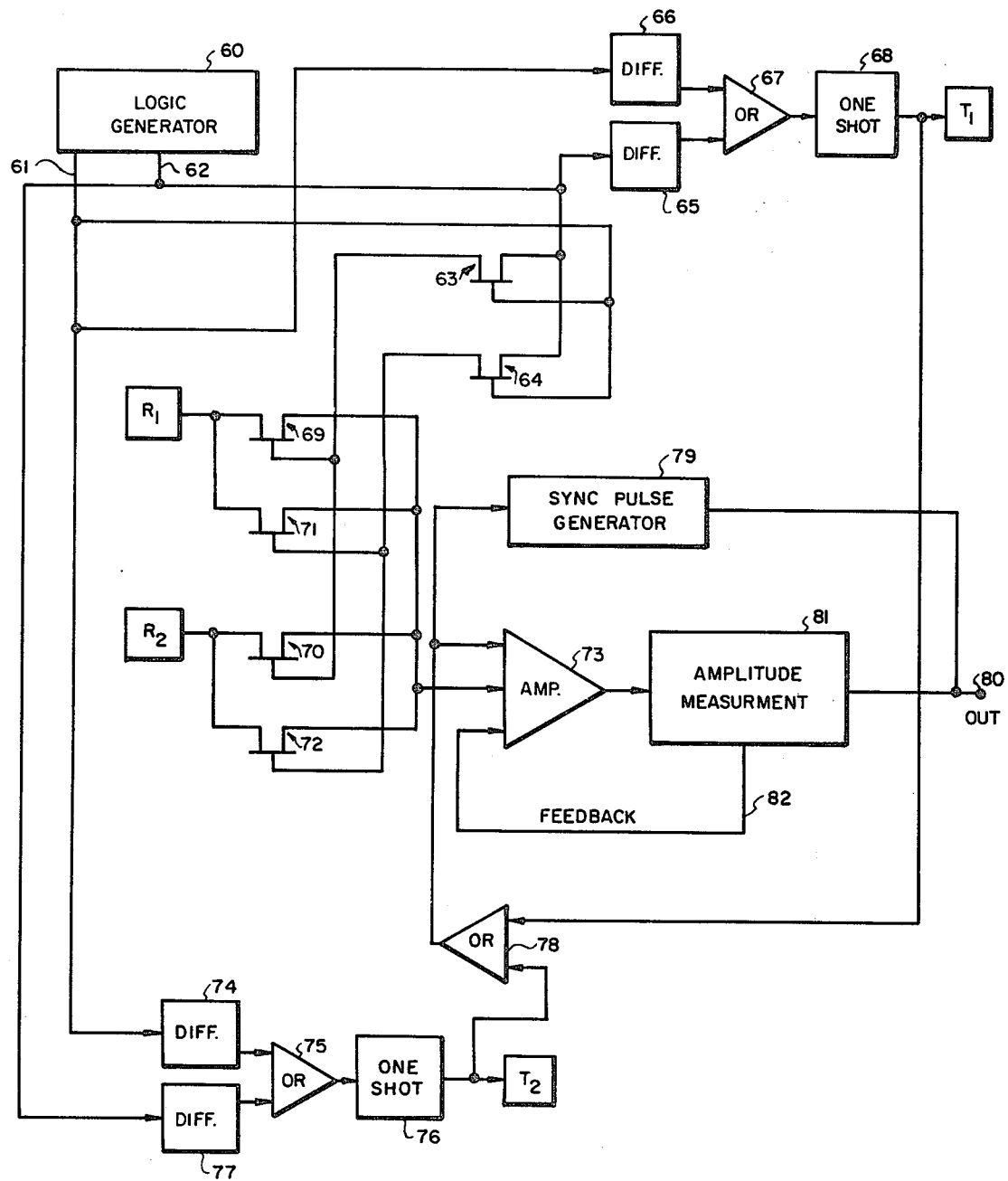
Figure 5A:
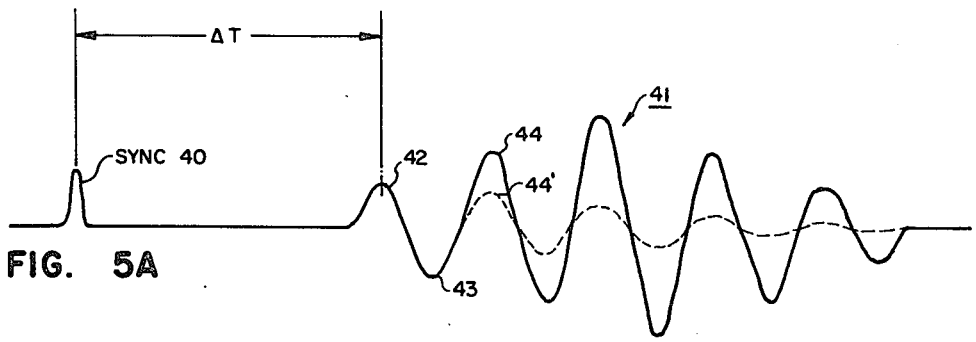
Figure 5B:
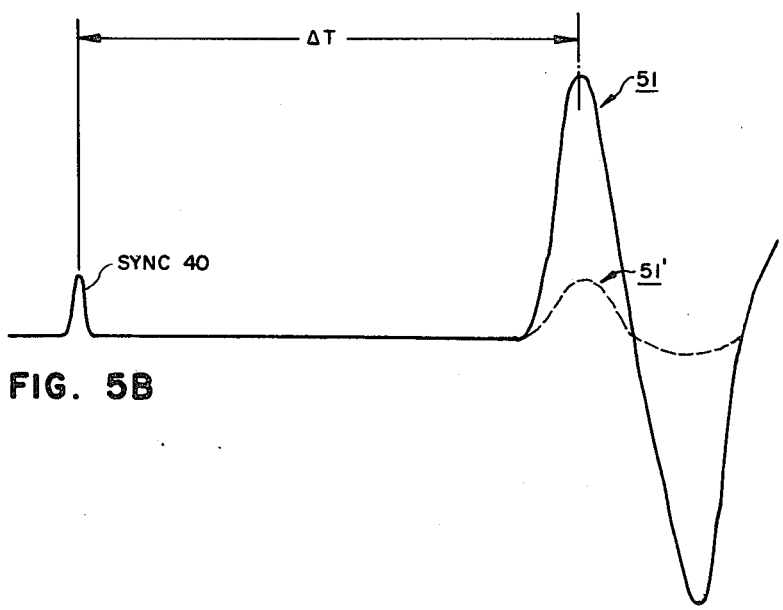

FIG. 3 schematically illustrates, partly in block diagram, a two transmitter, two receiver embodiment of the invention;

FIGS. 4A and 4B graphically illustrate the logic signals used to control the system illustrated in FIG. 3; and FIGS. 5A and 5B graphically illustrate characteristic compressional and shear acoustic waves, respectively.

Figure 1:
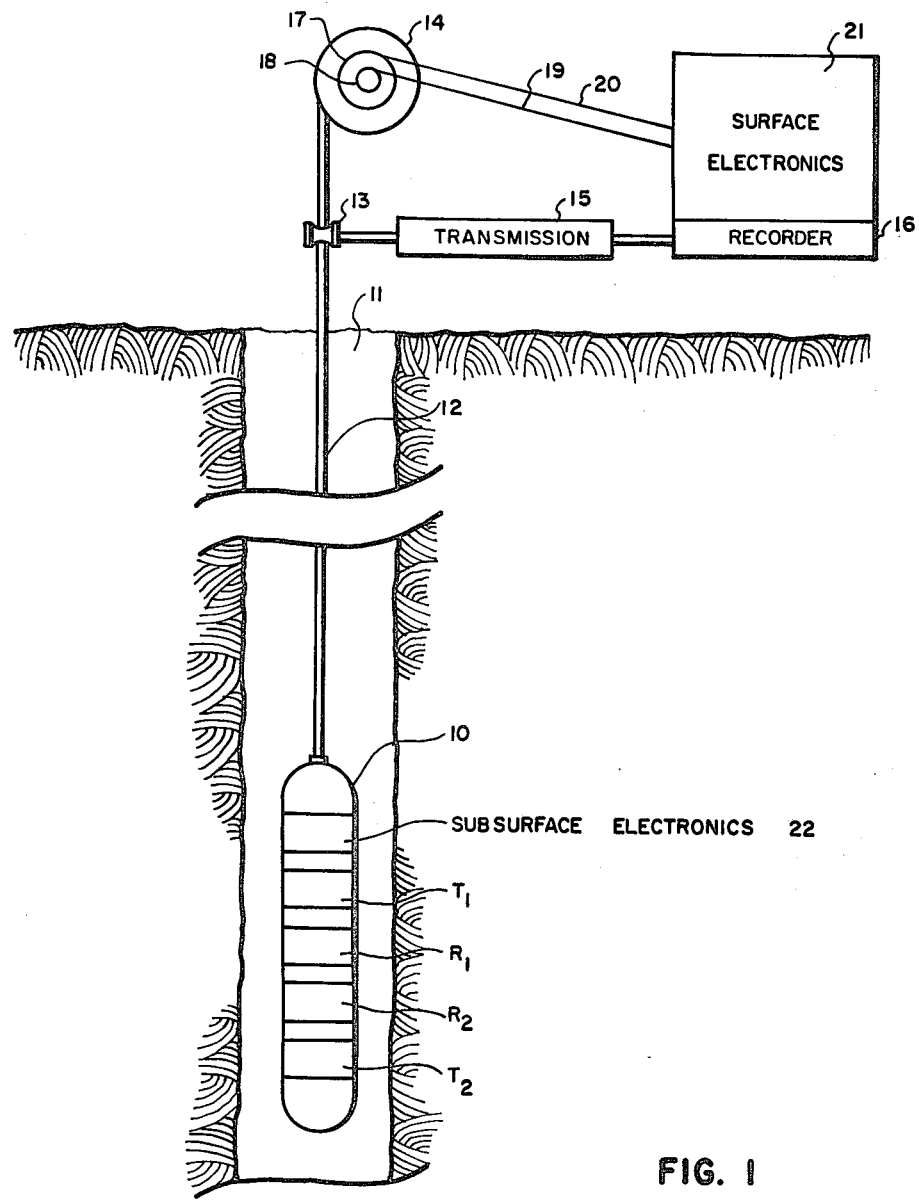
FIG. 1 is a side elevational view, partly in cross section, of a well logging instrument within an earth borehole in accordance with the invention.

Referring now to FIG. 1, there is illustrated an acoustic well logging instrument 10 suspended in an earth borehole 11 by a well logging cable 12 which passes over a measuring sheave 13 to a hoist drum 14. The measuring sheave 13 is connected to a transmission 15 which in turn drives a recorder 16 to enable the well logging data to be recorded as a function of depth of the well logging instrument within the borehole. Slip rings 17 and 18 on the end of the hoist drum 14 are electrically connected by conductors 19 and 20 to surface electronics 21 which is used for gathering and processing the well logging data from the well logging instrument 10.

The elongated well logging instrument 10 includes a first transmitting transducer $T_1$, a first receiving transducer $R_1$, a second receiving transducer $R_2$ and a second transmitting transducer $T_2$. The well logging instrument 10 also includes subsurface electronics 22 which will be explained in more detail hereinafter.

Referring now to FIG. 2, there is illustrated in block diagram a single acoustic transmitter transducer 31 bearing the legend "TRANSMITTER" and a single acoustic receiving transducer 32 bearing the legend "RECEIVER". The output of receiver 32 is connected to the input of a variable gain amplifier 33 whose output is connected to an amplitude measurement circuit 34. The amplitude measurement circuit 34 includes means for generating a signal functionally related to the amplitude of each succeeding positive half cycle of the electrical waveform from the amplifier 33. The signals so generated are coupled back by the conductor 35 as a negative feedback to the amplifier 33 to decrease its gain. In the preferred embodiment, the variable gain amplifier 33 is a conventional binary gain-ranging amplifier which decreases its gain by a factor of 2 for each succeeding signal from the negative feedback line 35. The transmitter 31 also causes a sync pulse to be carried along the conductor 36 to the output junction 37 which, along with the electrical waveform from the circuit 34 is transmitted to the earth's surface along the well logging cable 12. The transmitter 31 also causes a reset pulse to be coupled along the conductor 38 to the variable gain amplifier 33 which restores the gain of the amplifier 33 to its full gain state as existed prior to being decreased by the negative feedback signals along the conductor 35.

In the operation of the embodiment illustrated in FIG. 2, the transmitter 31 resets the gain of amplifier 33 to its full gain state while at the same time transmitting an acoustic wave which is received by the receiver 32 and also causes a transmitter sync pulse to be located on the output junction 37. After the receiver 32 receives the acoustic wave from the transmitter 31, an electrical waveform corresponding to the received acoustic wave is coupled into the amplifier 33 whose output is then coupled into the amplitude measurement circuit 34. At this point, the amplifier 33 is set at full gain. The further operation of the circuitry illustrated in FIG. 2 can best be understood by referring also to FIGS. 5A and 5B which illustrate representative acoustic waveforms. At some time after the transmitter is pulsed and the sync pulse 40 is generated, the compressional wave 41 is received at the receiver 32. Various acoustic logging techniques known in the art depend upon measuring the time differential between the sync pulse 40 and some characteristic of the wave 41, but for purposes of illustration, it is assumed that there is an interest in measuring the $\Delta t$ between the sync pulse 40 and the arrival of the first positive half cycle 42. Quite obviously, the first positive half cycle 42 will have some measurable amplitude. For further purposes of illustration, assume that the amplitude measurement circuit 34 is configured to generate a negative feedback pulse if the amplitude of the positive half cycle 42 exceeds 50% of some arbitrary full scale amplitude. Assuming further that the half cycle 42 as illustrated does exceed that level, then a feedback signal is generated during the next succeeding negative half cycle 43 to reduce the gain of the amplifier 33 by a factor of 2. During the next succeeding positive half cycle 44, instead of the positive half cycle 44 having the amplitude as shown by the solid line, it will exhibit the amplitude 44' as shown by the dotted line. In a similar manner, as long as each succeeding positive half cycle exceeds 50% of full scale, the gain of the amplifier 33 will continue to be reduced by an additional factor of 2. In effect, when this occurs, the gain of amplifier 33 is reduced to one-half, one-fourth, one-eighth, one-sixteenth, etc. until no positive half cycle exceeds the 50% value.

FIG. 5B illustrates the arrival of the shear wave 51 which arrives later because of its velocity being considerably slower than that of the compressional wave 41, sometimes being approximately 60% of the compressional wave velocity. The amplitude of the shear wave 51 is frequently substantially greater than that of the compressional wave as illustrated by the solid line. Because of the reduction in gain of the variable gain amplifier as previously discussed, the gain of the amplifier 33 will be such that only the dotted line waveform 51' will be passed through the system. In this manner, the Δt between the sync pulse 40 and some point on the shear wave 51', for example, the first arrival, is then easily measured. This thus avoids the problem of having the shear wave saturate the system upon its arrival.

Referring now to FIG. 3, the subsurface electronics 22 is shown in greater detail in conjunction with the two acoustic transmitters $T_1$ and $T_2$ and the two acoustic receivers $R_1$ and $R_2$. A logic generator circuit 60 has two primary outputs, a transmitter logic output 61 and a receiver logic output 62. The logic signals are preferably generated originally at the earth's surface, sent along to the well logging instrument over the logging cable, and then "squared up" within the subsurface electronics. The transmitter logic is coupled into the respective gates of FET's 63 and 64. The source electrodes of FET's 63 and 64 are connected together and also to the input of a differentiator circuit 65 and also to the receiver logic output 62. The transmitter logic output 61 is also connected to the input of a second differentiator circuit 66. The outputs of the differentiator circuits 65 and 66 are connected, respectively, to the two inputs of an OR gate 67 which drives a one-shot multivibrator circuit 68 which in turn drives the input of the acoustic transmitter $T_1$.

The drain electrode of the FET 63 is connected to the gates of FET's 69 and 70. The output of receiver $R_1$ is connected to the source electrodes of FET's 69 and 71. The receiver $R_2$ is connected to the source electrodes of FET's 70 and 72. The drain electrodes of FET's 69, 70, 71 and 72 are connected together and to the input of a variable gain amplifier 73. The drain electrode of FET 64 is connected to the gate electrodes of FET's 71 and 72.

The transmitter logic output 61 is also connected to a differentiator circuit 74 whose output is connected to one input of an OR circuit 75 which drives a one-shot multivibrator circuit 76 which in turn is connected to the input of transmitter $T_2$. The receiver logic output 62 is also connected to a differentiator circuit 77 which is connected to a second input of the OR gate 75. The output of the one-shot multivibrator circuit 76 is also connected to one input of an OR gate 78 whose output is connected both to the input of a sync pulse generator 79 and to an additional input of the amplifier 73 which resets the gain of the amplifier 73 to its full gain state. An additional input to the OR gate circuit 78 is provided from the output of the one-shot multivibrator circuit 68. The output of the sync pulse generator 79 is connected to the output junction 80. The output of the variable gain amplifier 73 is connected to an amplitude measurement and feedback signal generating circuit 81 which generates a negative feedback signal along the connector 82 to an additional input of the amplifier 73 for reducing its gain. The output of the amplitude measurement circuit 81 is also connected to the output junction 80.

In the operation of the system described in FIG. 3, it should be appreciated that the logic generator circuit 60 generates electrical signal logic which is illustrated by the representative waveforms illustrated in FIGS. 4A and 4B. The transmitter logic output 61 has as its waveform the square wave 90 illustrated in FIG. 4A and the receiver logic waveform 91 is a square wave as illustrated in FIG. 4B for use on the receiver logic output 62.

It is well known in the prior art to provide borehole compensation by the use of two transmitters and two receivers through averaging techniques to compensate for wash-out in the borehole or similar anomalies. The borehole compensating tool with its two transmitters and two receivers requires four successive cycles to complete one interval time measurement. This is due to the method of alternating receivers in order to transmit the received acoustic signals to the surface in their entirety. The sequence of making this one reading is as follows:

(1) Pulse transmitting transducer $T_1$ and measure the time for sound to travel to receiver $R_2$, this time being designated $T_1R_2$.
(2) Pulse $T_1$ again and measure time interval to receiver $R_1$, this time interval being designated $T_1R_1$.
(3) Pulse transmitter $T_2$ and measure the time for sound to travel to receiver $R_1$, this being designated $T_2R_1$.
(4) Pulse transmitter $T_2$ and measure the time for sound to reach receiver $R_2$, this being designated $T_2R_2$.

In the surface electronics, these measurements are combined in the manner shown below to obtain one complete measurement of the time interval:

$$T = (T_1R_2 - T_1R_1 + T_2R_1 - T_2R_2)/2$$

In using the generated logic waveforms 90 and 91, it should also be appreciated that the FET's 69 and 71 are complementary to each other, the FET's 70 and 72 are complementary to each other, and the FET's 63 and 64 are complementary to each other.

Thus, the FET's 63, 69 and 72 in the preferred embodiment operate upon the principle that a positive-going logic applied to the gates of each of these will pass a signal from the source to the drain whereas the FET's 64, 70 and 71 operate on the principle that a negative signal applied to their gates will pass a signal from the source to the drain. It should also be appreciated that this logic contemplates the transmitter $T_1$ firing when either of the square waves 90 or 91 go positive and the transmitter $T_2$ firing when either square wave goes negative. It further contemplates that receiver $R_1$ will be activated on the positive portion of the square wave 91 and conversely, receiver $R_2$ will be activated when the square wave 91 goes negative.

Thus, assume first that the transmitter logic wave 90 goes positive while the square wave 91 is still negative. This drives the gate of FET 63 which means that the FET's 69 and 70 will be operative with respect to the receiver logic. Since FET 70 operates upon a negative-going gate drive, the receiver signal from $R_2$ is the only one passed to the input of the amplifier 73. When the square wave 91 then goes positive, the FET 69 is activated to pass the receiver $R_1$ signal to the amplifier 73. Similar principles apply to FET's 71 and 72 whenever the transmitter logic switches negative to drive the FET 64. Thus, alternately, the amplifier 73 sees the signals $T_1R_2$, $T_1R_1$, $T_2R_1$ and $T_2R_2$.

In firing the transmitters $T_1$ and $T_2$, the logic waveforms 90 and 91 are also applied to the differentiator circuits 65 and 66, and to circuits 74 and 77 to control the OR gates 67 and 75, respectively, and the one-shot multivibrator circuits 68 and 76, respectively. The differentiator circuits 65 and 66 each produce a pulse in response to a positive transition. Conversely, circuits 74 and 77 each produce a pulse in response to a negative transition. Thus, the transmitter $T_1$ will fire whenever there is a positive-going transition in either the square wave 90 or the square wave 91 and the transmitter $T_2$ will fire whenever there is a negative-going transition of the square wave 90 or the square wave 91. It should also be appreciated that the outputs of the one-shot multivibrators 68 and 76 are OR gated to the reset gain input of amplifier 73 and also to the sync pulse generator 79 so that the gain of amplifier 73 is restored to its full gain value whenever either of the transmitters is fired and also a sync pulse is generated in response to either of these transmitters being fired.

The operation of the amplifier 73, the amplitude measurement and signal generating circuit 81 and the feedback loop 82 is substantially the same as that illustrated with respect to the operation of the similar components in the circuit of FIG. 2.

While particular embodiments of the present invention have been illustrated and described, it is apparent that changes and modifications may be made without departing from this invention in its broader aspects. For example, various other parameters may be measured other than the amplitude of a positive half cycle. For example, the amplitude of a negative half cycle may be used to reduce the gain of the subsurface amplifier. Likewise, instead of using an amplitude measurement, those skilled in the art will recognize that the slope of a particular half cycle may be measured and a signal generated from such a measurement to provide feedback. Likewise, the zero crossover point between positive and negative half cycles can be similarly utilized. Furthermore, although the preferred embodiment contemplates the utilization of a subsurface amplifier between a given receiver and the parameter measurement circuitry, those skilled in the art will recognize that the parameter measurement circuitry can be interjected between the receiver and the subsurface amplifier. In a similar manner, positive feedback may be generated to alter the gain as by an increase rather than as a decrease in gain.

The embodiments of an invention in which an exclusive property or privilege is claimed are defined as follows:

1. Apparatus for logging the formations surrounding an earth borehole, comprising:

an elongated instrument adapted to traverse an earth borehole;
an acoustic pulse transmitter within said instrument for generating an acoustic wave;
an acoustic receiver within said instrument for generating cyclically varying electrical waveforms in response to the receipt by said receiver of acoustic waves from said transmitter;
a variable gain amplifier within said instrument connected to the output of said receiver;
circuit means connected to the output of said amplifier for measuring the amplitude of at least one-half cycle of one of said electrical waveforms and for generating a feedback signal functionally related to said measured amplitude;
means for reducing the gain of said amplifier a preselected amount in response to said feedback signal; and reset means for restoring said gain of said amplifier to its pre-reduction level in response to said transmitter generating an acoustic wave.

2. Apparatus for logging the formations surrounding an earth borehole, comprising:

an elongated instrument adapted to traverse an earth borehole,
an acoustic pulse transmitter within said instrument for generating an acoustic wave;
an acoustic receiver within said instrument for generating cyclically varying electrical waveforms in response to the receipt by said receiver of acoustic waves from said transmitter;
a variable gain amplifier within said instrument;
circuit means within said instrument for measuring a parameter relating to at least a portion of one of said electrical waveforms and for generating a signal functionally related to the said measured parameter;
means for decreasing the gain of said amplifier by a pre-selected factor in response to said generated signal; and
reset means for increasing said gain of said amplifier to a preset upper level in response to said transmitter generating an acoustic wave.

3. Apparatus for logging the formations surrounding an earth borehole, comprising:

an elongated instrument adapted to transverse an earth borehole;
an acoustic pulse transmitter within said instrument for generating an acoustic wave;
an acoustic receiver within said instrument for generating cyclically varying electrical waveforms in response to the receipt by said receiver of acoustic waves from said transmitter;
a variable gain amplifier within said instrument connected to the output of said receiver;
circuit means connected to the output of said amplifier for measuring the amplitude of the first arriving positive one-half cycle of one of said electrical waveforms and for generating a feedback signal functionally related to the said measured amplitude exceeding a given level;
means to decrease the gain of said amplifier a preselected discrete amount in response to said feedback signal; and
reset means for restoring said amplifier gain to a preselected level in response to the generation of an acoustic wave by said transmitter.

4. Method for logging the formations surrounding an earth borehole, comprising the steps of:

traversing an earth borehole with a well logging instrument;
generating an acoustic wave from said instrument;
receiving acoustic waves at a receiver within said instrument;
generating cyclically varying electrical waveforms in response to the receipt by said receiver of acoustic waves from said tansmitter;
measuring the amplitude of at least one-half cycle of one of said electrical waveforms and generating a feedback signal functionally related to the said measured amplitude;
decreasing the gain of said amplifier a pre-selected discrete amount in response to said feedback signal; and
restoring the gain of said amplifier to a pre-selected level upon each generation of an acoustic wave by said instrument.

5. A structure adapted for use in investigating earth formations, comprising:
an elongated support member adapted for movement through a borehole;
acoustic transmitting means;
acoustic receiving means;
amplifier means with the input from said amplifier derived from said receiving means;
detector means to measure the amplitude of the output of said amplifier and generate a feedback signal in relation to said amplifier output amplitude;
circuit means for decreasing gain of said amplifier from a pre-selected level in pre-selected discrete steps in response to said feedback signal; and
reset means for restoring said gain to said preselected level in response to said acoustic transmitter means generating an acoustic pulse.

6. An acoustic apparatus for logging earth formations surrounding a borehole, comprising:
an elongated instrument body for traversing an earth borehole;
upper and lower acoustic transmitter means;
two acoustic receiver means located between said upper and lower transmitter means capable of detection of an acoustic signal after said acoustic signal travels through the formation as well as travelling over the face of the formation;
amplifier means capable of gain adjustment connected to said receiver means;
means to detect the amplitude of the positive one-half cycle of said amplifier output and generate a gain control feedback signal based on said detected amplitude for decreasing said gain in pre-selected discrete steps;
circuit means for decreasing said gain in said pre-selected discrete steps during a succeeding negative one-half cycle; and
reset means responsive to generation of an acoustic signal by said upper and said lower acoustic transmitter means for restoring said gain to a pre-selected threshold level.

7. An acoustic apparatus for logging earth formations surrounding a borehole, comprising:
an instrument adapted for passage through a well bore;
acoustic transmitting means within said instrument;
acoustic receiving means within said instrument for generating an electrical waveform in response to said transmitting means output passing through and over said earth formations;
variable gain circuit means for amplification of said receiving means waveform;
circuit means to detect the amplitude of one-half cycle of said amplified receiver waveform and to generate an amplifier gain adjust feedback signal in response thereto;
means to decrease said amplifier gain in response to said feedback signal; and
reset means for increasing said gain to a pre-selected level in response to the generation of an acoustic signal.

8. An acoustic apparatus for logging earth formations surrounding a borehole, comprising:
an instrument adapted for passage through a well bore;
a plurality of acoustic transmitting means within said instrument;
a plurality of acoustic receiving means within said instrument for generating electrical waveforms in response to the generation of acoustic waves by said transmitting means;
variable gain circuit means for amplification of said electrical waveforms;
circuit means to detect the amplitude of at least a portion of said electrical waveforms and to generate a feedback signal in response to said amplitude;
circuit means to detect said feedback signal and reduce said amplifier gain in response to said feedback signal; and
reset means to increase said amplifier gain to its maximum level in response to generation of an acoustic signal by said acoustic transmitting means.

9. An acoustic apparatus for logging earth formations surrounding a borehole, comprising:
instrument adapted for passage through a well bore;
a plurality of acoustic transmitting means within said instrument;
a plurality of acoustic receiving means within said instrument for generating electrical waveforms in response to said transmitting means output;
variable gain circuit means for amplification of said receiving means waveforms;
circuit means to detect said amplifier output amplitude exceeding a predetermined level;
means to reduce said amplifier gain when said amplifier output amplitude exceeds said predetermined level; and
reset means to return said gain to its original unreduced level in response to the generation of an acoustic signal by each of said plurality of acoustic transmitting means.

10. An acoustic apparatus for logging earth formations surrounding a borehole, comprising:
an instrument adapted for passage through a well bore;
a plurality of acoustic transmitting means within said instrument;
a plurality of acoustic receiving means within said instrument for generating electrical waveforms in response to said transmitting means output;
amplifier means within said instrument capable of gain adjustment in response to a feedback signal;
means connected to said amplifier for detecting acoustic wave presence and generating said feedback signal; and
reset means connected between said plurality of transmitting means and said amplifier means for detecting the generation of an acoustic wave and for restoring the gain adjustment to is original level in response to said acoustic wave generation.

11. An acoustic apparatus for logging earth formations surrounding a borehole, comprising:
   an instrument adapted for passage through a well bore;
   a plurality of acoustic transmitting means within said instrument;
   a plurality of acoustic receiving means within said instrument for generating electrical waveforms in response to said transmitting means output;
   variable gain circuit means for amplification of said receiving means waveforms; and
   circuit means connected to said amplifier for detecting an acoustic wave exceeding an amplitude limit and generating said feedback signal in response to said amplitude limit being exceeded and for reducing said variable gain in response to said feedback signal generation; and reset means connected to said amplifier and responsive to the generation of an acoustic impulse by each of said plurality of transmitting means for returning said variable gain to a pre-selected level.

* * * * *